Figure 1:
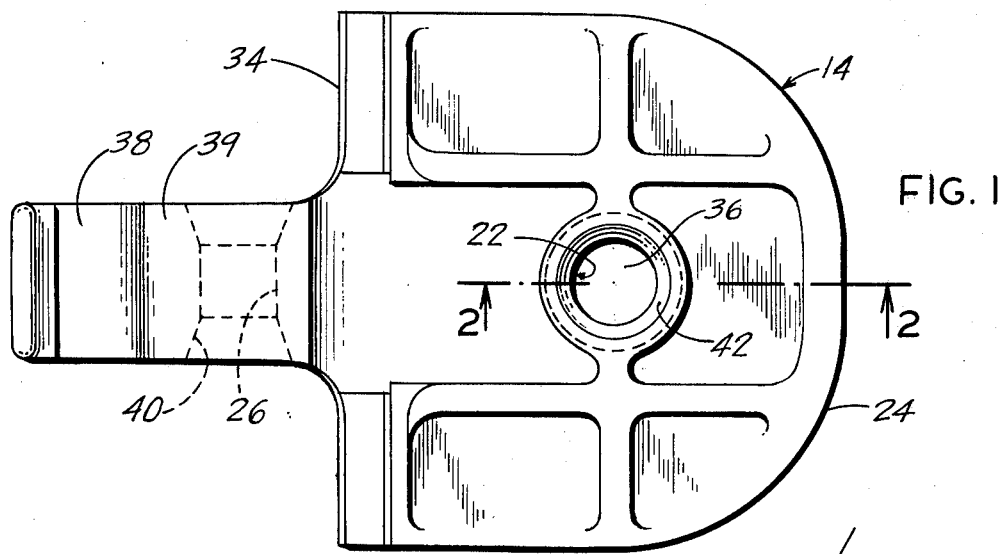

United States Patent [19]

Sierk

[11] 4,023,658

[45] May 17, 1977

[54] DETACHABLE WEAR PAD FOR THE THIRD RAIL SHOE ON AN ELECTRIC RAILWAY CAR

[75] Inventor: Raymond H. Sierk, Whitestone, N.Y.

[73] Assignee: Abex Corporation, New York, N.Y.

[22] Filed: Mar. 17, 1976

[21] Appl. No.: 667,663

[52] U.S. Cl. .................................................. 191/49
[51] Int. Cl.² .......................................... B60L 5/30
[58] Field of Search ............ 191/49; 339/65, 66 R, 339/66 M

[56] References Cited

UNITED STATES PATENTS

| | | | |
|---|---|---|---|
| 2,944,240 | 7/1960 | Barber | 339/66 M X |
| 2,972,728 | 2/1961 | Cole | 339/66 M X |
| 3,397,291 | 8/1968 | Maloney | 191/49 |
| 3,808,577 | 4/1974 | Mathauser | 339/65 X |

Primary Examiner—Stephen G. Kunin
Attorney, Agent, or Firm—Kinzer, Plyer, Dorn & McEachran

[57] ABSTRACT

The wear pad of a third rail shoe for an electric railway car has the electrode opening therein so configured as to tip the electrode substantially to the attitude of the overhead cable attached to the electrode.

5 Claims, 4 Drawing Figures

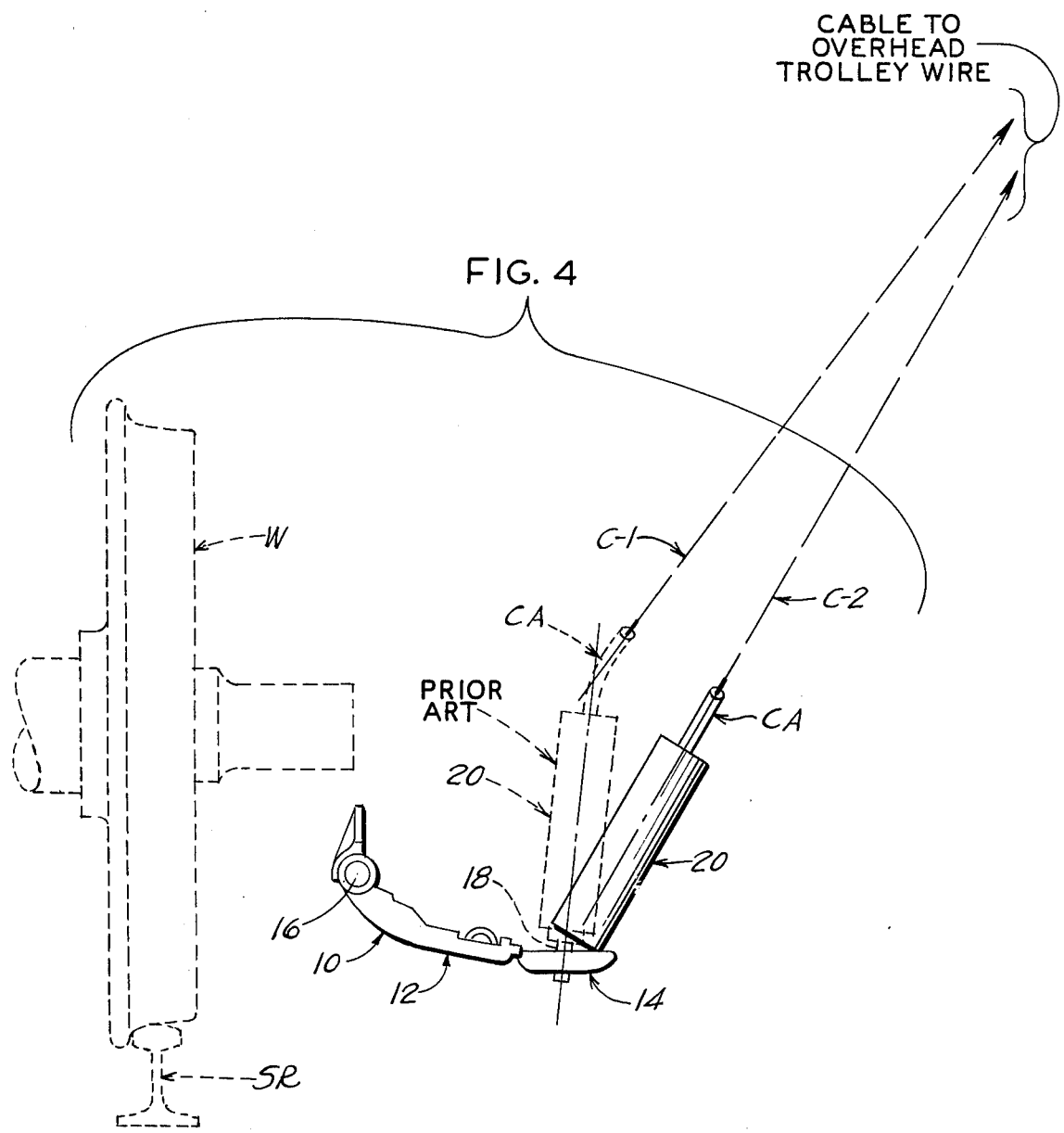

DETACHABLE WEAR PAD FOR THE THIRD RAIL SHOE ON AN ELECTRIC RAILWAY CAR

This invention relates to a third rail shoe by which current is delivered to the propulsion motor of an electric railway car. In particular the invention is concerned with the structure of the detachable wear pad which is composed of conductive metal.

An electric railway car is usually propelled by a high voltage shop contact mechanism when it is inside the shop or car barn. The contact mechanism consists generally of two spring actuated insulated telescoping tubes, the inner one of which may be connected to a high voltage cable at the upper end and to an electrode at the bottom end. The electrode is normally retained within the outer protective tube when the device is not in use. The electrode may be moved to an exposed position and held by a latching device in preparation for manual application to the third rail contact shoe inside the shop, thus providing power to the car. The wear pad has an opening therethrough to accept and retain the electrode until manually removed by shop personnel.

The shop contact mechanism cable is connected to an overhead trolley which moves parallel to the shop tracks. The trolley has limited travel within the shop.

Thus, cars are moved within the shop by means of power supplied to the wear pad of the contact shoe as described above.

For example, the cars are coupled within the shop in preparation for a train move out of the shop. In this sequence of operations, shop personnel "walk" the train within the shop by holding the shop contact mechanism electrode in place on the wear pad until the leading car of the train is in contact with the third rail outside of the shop.

The shop contact mechanism is to be manually separated from the wear pad by shop personnel prior to reaching the travel limits of the overhead trolley; but sometimes the shop contact mechanism is inadvertently left in place during a train move out of the shop, tending to stretch the overhead cable beyond the travel limits of the overhead trolley. This occurrence can result in considerable damage to the overhead trolley system, to the connecting cable and to the shop electrode mechanism which does not readily pull out of the wear pad as presently arranged.

The primary object of the present invention is to enable the electrode to be quickly released in the event there is failure to release it manually and to account for easy release as an incident to the tug on the cable when the limit of trolley travel is reached. Expressed another way, the primary object of the invention is to enable the electrode to be separated from the wear pad by the very circumstance which gives rise to the trouble heretofore encountered, namely, failure by the responsible attendant himself to comply with the shop procedure.

Specifically, it is an object of the present invention to use the force exerted on the overhead cable, when the limit of trolley travel is reached, to extract the electrode from its socket in the wear pad, and to enable this force to be applied advantageously by assuring the electrode is tipped on an axis substantially coincident, or nearly so, with the angle of inclination assumed by the cable.

Figure 2:
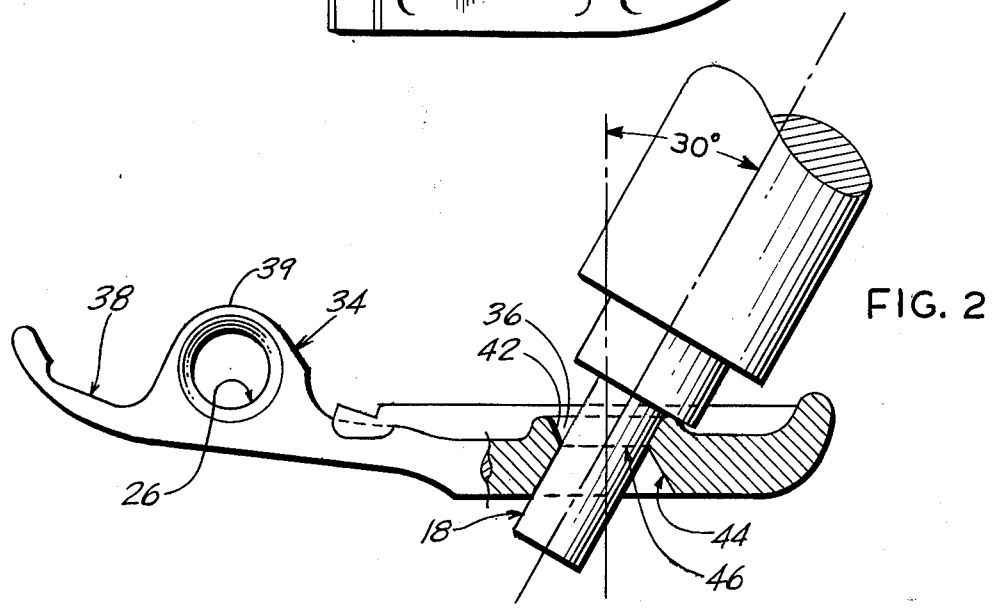
Figure 3:
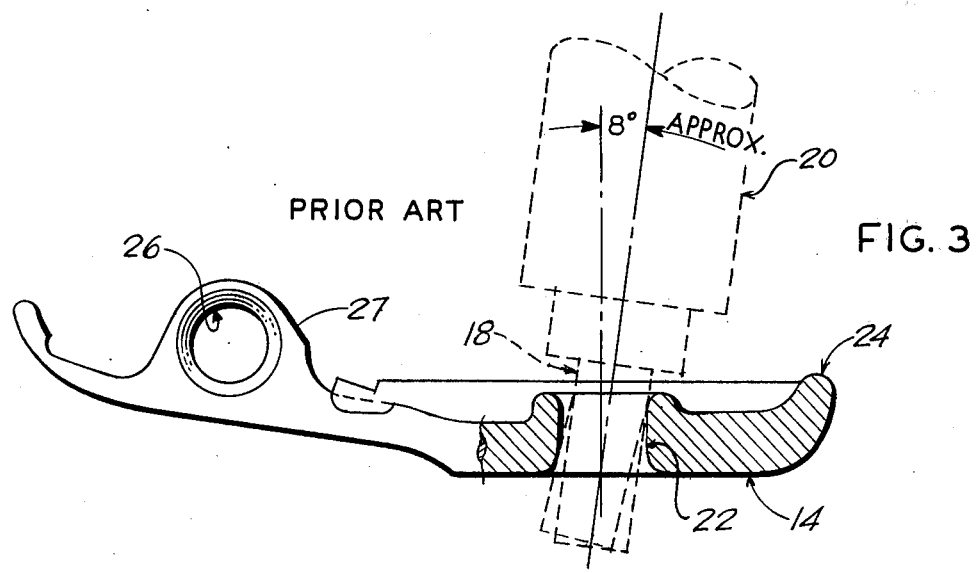

In the drawing:

FIG. 1 is a plan view of a wear pad constructed in accordance with the present invention;
FIG. 2 is a side elevation of the pad, partly in section;
FIG. 3 is a view similar to FIG. 2 but showing the prior art configuration; and
FIG. 4 is a schematic view showing shop practice.

The general relationship prevailing between the car, the third rail shoe and the overhead power supply inside the shop is shown in FIG. 4. The wheel W of the car rides on a shop rail SR. The shoe assembly 10 is located on the outside of the wheel and comprises a fulcrum member 12 on which is pivotally mounted the wear pad 14 which is composed of electrically conductive metal. The support or fulcrum member 12 includes an opening 16, on the inboard side, for receiving a shaft (not shown) enabling the shoe 10 to be mounted for articulated movement on the car track.

There is no third rail in the shop. Rather, current for moving the car through the shop, as the occasion arises, is derived from a cable CA attached at one end to an electrode 18 supported by an insulated handle 20. When the car is to be propelled inside the shop, an attendant grasps the handle 20 and inserts the electrode 18 into a socket opening in the pad 14 as shown in more detail in FIG. 3.

Referring to FIG. 3, the wear pad 14 is provided with an opening 22 extended therethrough. The opening 22 is located inboard of the free end 24 of the pad 14. The pad 14 includes means for detachably and pivotally supporting the pad on the fulcrum member 12 as already mentioned, and such means may take the form of a keyway 26 presented by a strap 27.

As denoted in FIG. 3, the structure there shown is known and in fact conforms to the structure shown in my prior U.S. Pat. No. 2,892,904.

As shown in FIG. 3, the opening 22 is on a true vertical axis. The electrode 18 when inserted therein may tip slightly (say 8° for a new wear pad) due to the slight oversize of the opening 22 to facilitate ease of insertion. There may be slightly more tipping as a consequence of wear but the important consideration, giving rise to the present invention is shown in FIG. 4, by the dotted line position of the electrode, its holder and the overhead cable.

As noted above, the shop cable CA is connected at its remote end to an overhead trolley (not shown). The angle of inclination of the cable downward from the trolley may be assumed to be the center line C-1. This angle represents a considerable divergence from the axis of the electrode, which normally is nearly vertical. Consequently, if the attendant forgets to remove the electrode from the wear pad of a car walked through the shop, when the overhead trolley reaches its limit of travel, and if the car is coupled to one ahead which is moving out of the shop under its own power, the entire shop electrode connections may be literally torn assunder. The possibility becomes more pronounced as the pad wears away at the bottom because, as the pad wears, the lower edge of the opening is sharpened compared to the slight chamfer which exists on a newly cast pad. The sharp edge acts as a wedge on the electrode, resisting extraction.

In accordance with the present invention, I take advantage of the tug on the cable, when the limit of trolley travel is reached, to displace the electrode in the event it was not manually withdrawn. This advantageous result, contributing to shop safety, is achieved by only a slight change in the pad shown in FIGS. 1 and 2.

The wear pad of the present invention, shown at 34 in FIGS. 1 and 2, is substantially identical to the pad shown in my earlier patent except for the geometry of the opening therein which receives the electrode. Thus, the pad 34, as in the earlier patent, has an opening 36 extended therethrough, FIG. 1, the opening being located outboard of the rearwardly extending tongue 38 which has a strap 39 affording the keyway 40 constituting means by which the pad 34 is pivotally and detachable supported on the fulcrum member of the shoe assembly. However, the opening 36, instead of being limited by a cylindrical wall having a vertical axis as heretofore, has a tapered wall which allows the electrode to tip substantially parallel to the attitude of the cable, best shown in FIG. 2. Thus, the opening 36 is configured to enable the electrode to tip to a more horizontal attitude, say about 30°. Such configuration is achieved by a counter-sunk wall 42 at the upper end of the opening and a counter-sunk wall 44 at the bottom of the opening, meeting at a common horizontal diameter 46 within the opening 36. Viewed another way, wall 42 diverges upwardly from the base diameter 46 and wall 44 diverges downwardly therefrom so that in cross-section the walls 42 and 44 are frusto-conical. Consequently, the opening 36 has an axis substantially coincident with the inclination of the cable, best shown in FIG. 4 where the electrode holder 20, shown by solid line, has its electrode tipped to the inclination of the cable center line C-2. Indeed, since the inclined axis of opening 36 may be viewed as lying anywhere about the side wall 42 or side wall 44, the electrode itself has an infinite number of attitudes (swivel position) for conforming to the angle of inclination of the cable.

Preferably the length of wall 44 is longer than the length of wall 42; that is counter-sink 44 is deeper than counter-sink 42. This assures a good purchase of the electrode in opening 36 in the first place (increased contact) but more importantly no sharp edge will be created at the bottom of opening 36 due to pad wear as heretofore experienced.

I claim:

1. An electrically conductive wear pad for a third rail shoe having an opening therethrough for loosely receiving a shop transfer electrode plug which is connected to an inclined overhead trolley cable, thereby enabling a car to be walked through the shop, said pad adjacent one end thereof having attaching means enabling the pad to be detachably supported by a fulcrum member, said opening being located outboard of said attaching means, and said opening having an axis tipped substantially in the outboard direction whereby the electrode plug fitted therein is tipped with its axis substantially parallel to the inclination of the cable.

2. A wear pad according to claim 1 wherein said opening has upper and lower ends and is counter-sunk at each of said ends enabling the electrode to swivel in and about said opening.

3. A wear pad according to claim 2 wherein the counter-sink is deeper at the lower end than at the upper end.

4. A wear pad according to claim 2 wherein the counter-sinks meet at a common horizontal diameter within the opening.

5. A wear pad according to claim 4 wherein the counter-sink is deeper at the lower end than at the upper end.

* * * * *